Jan. 17, 1967   T. M. ARNOLD   3,298,604
CALCULATING DEVICE
Filed July 19, 1965   3 Sheets-Sheet 1
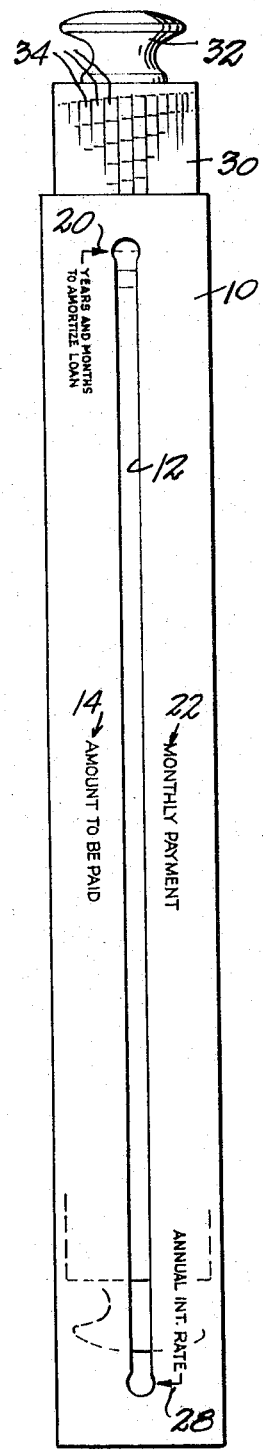
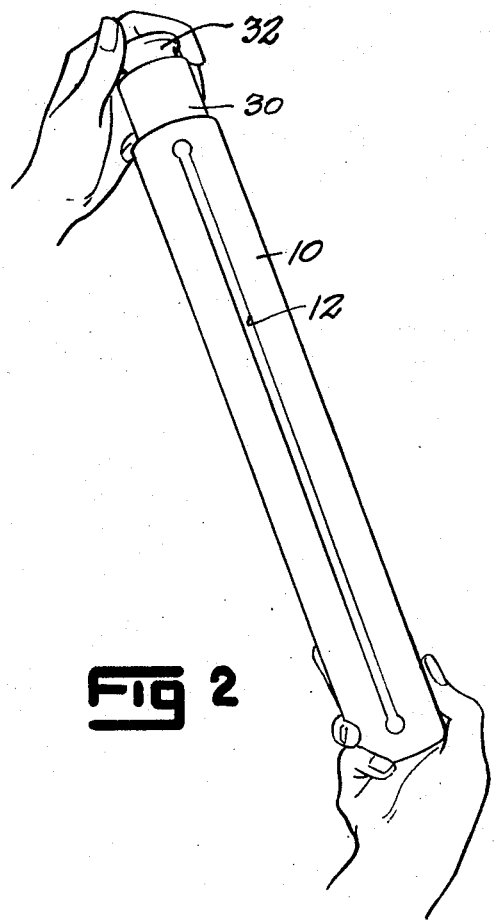
Fig 2
Fig 1
INVENTOR.
THEODORE M. ARNOLD
BY
ATTORNEY Jan. 17, 1967  T. M. ARNOLD  3,298,604
CALCULATING DEVICE Filed July 19, 1965  3 Sheets-Sheet 2

INVENTOR.
THEODORE M. ARNOLD
BY Eugene C. Knoblock
ATTORNEY

United States Patent Office 3,298,604
Patented Jan. 17, 1967

3,298,604
CALCULATING DEVICE
Theodore M. Arnold, 32718 Grand River Ave.,
Farmington, Mich. 48024
Filed July 19, 1965, Ser. No. 472,963
4 Claims. (Cl. 235—87)

This invention relates to improvements in calculating devices, and more particularly to a device for making calculations of different types involving the payment of interest upon money at various rates for various periods of time. The device is well suited for computing the amortization of a mortgage or loan at a selected interest rate and subject to selected payments on the loan, or for calculating the monthly payments required on a given amount over a selected number of years at a selected rate of interest, or for similar computations.

Calculating devices which have been available heretofore for making calculations of the type in question, have usually required at least three parts shiftable relative to each other. One type has involved a substantially flat unit consisting of two parts slidable relative to each other and a further slider part with a hairline to transfer or guide readings between different scales of the first named parts. Another type of calculating device has entailed the use of a slotted tubular member and a cylindrical inner member, both bearing scales to be read in conjunction with each other by the use of a slidable cursor ring having a hairline, but such devices have not been constructed to calculate interest, etc.

It is the primary object of this invention to provide a calculating device which utilizes only two relatively shiftable parts consisting of a slotted tubular outer part and a cylindrical inner part slidable and rotatable in the outer part.

A further object is to provide interfitting slotted tubular and cylindrical parts, each having a plurality of scales extending lengthwise thereof, wherein the inner cylindrical member is also provided with circumferential lines in predetermined relation to each of the longitudinal scales thereon at opposite ends thereof and adapted to guide the setting of the inner member relative to the tubular member to establish a relationship of the parts from which direct readings can be made between selected registering indicia upon a selected one of the scales on the outer tubular member and an exposed scale on the inner member, or adapted to be used in taking a reading on a scale of the outer tubular member.

A further object is to provide a device of this character which is simple in construction, accurate, easy to operate, and inexpensive.

Other objects will be apparent from the following specification.

In the drawings:

FIG. 1 is a view of the device in side elevation;

FIG. 2 is a perspective view illustrating the manner in which the parts are manipulated to set the device;

Figure 3:
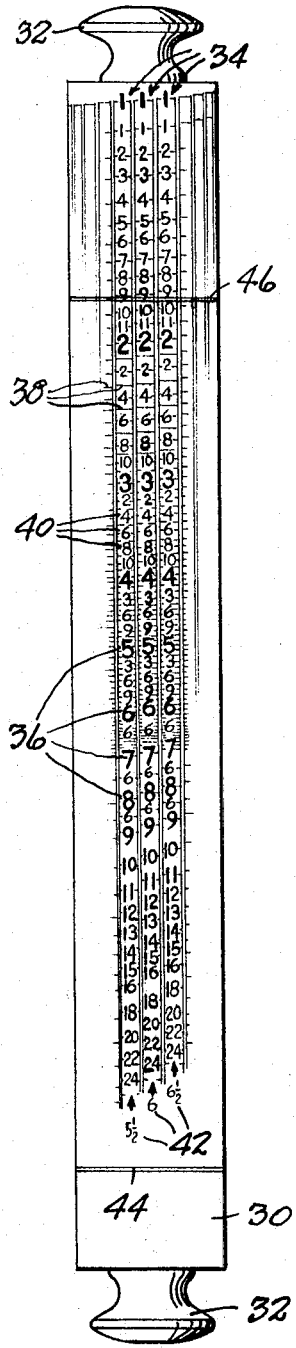
FIG. 3 is a view in side elevation of the inner cylindrical member, illustrating the arrangement of several longitudinal scales of indicia thereon.

Referring to the drawings which illustrate the preferred embodiment of the invention, the numeral 10 designates a rigid elongated tubular member which is open at both ends. The tubular member 10 may be formed of metal, plastic, paper or other suitable material. Tubular member 10 is provided with a sight opening or window such as slot 12 extending lengthwise thereof for the major portion of the length thereof, and terminating substantially equally spaced from and adjacent to the opposite ends of the tube.

A linear group of indicia or scale 14, consisting of numerals 16 and circumferentially extending short indicator lines 18 juxtaposed to the numerals and to the slot, extends lengthwise along one side of the slot 12 for substantially the full length of said slot. For example, in one embodiment of the invention, the numerals 16 may range from "1000" to "20,000." The numerals 16 and the indicator lines 18 are spaced different distances, with the spacing of numerals and lines designating any predetermined amount being greatest adjacent the low end of the scale and decreasing progressively toward the high end of the scale. Thus, for example, the spacing between numerals "1000" and "1100" may be substantial and sufficient to permit the provision of ten indicator lines therebetween. At the opposite end of the scale the final numerals may be "19500" and "20000" spaced apart a distance much less than the numerals "1000" and "1100" at the opposite end of the scale, and may provide space for only five indicator lines 18. Suitable explanatory material may appear upon the tube 10 adjacent the scale 14, such as the words "amount to be paid." At one end of the tube 10, preferably beyond or outwardly of the low end of scale 14, may appear the words "years and months to amortize loan," having associated therewith an arrow or indicator 20 pointing to the slot 12.

A second linear group of indicia or scale 22 extends longitudinally on the tubular member 10 at the side of the slot 12 opposite that bearing scale 14, and consists of numerals 24 and short circumferential indicator lines 26 correlated to the numerals 24. The numerals 24 preferably extend from "5" to "100" and are spaced apart greatest at the low end of the scale and the spacing between them progressively decreases toward the opposite or high end of the scale.

The low ends of both scales 14 and 22 are adjacent the same end of the tube, and the high ends of both scales 14 and 22 are located adjacent the opposite end of the tube. Both scales are preferably of a length slightly shorter than the slot 12 and terminate inwardly from the ends of said slot.

The scale 22 preferably has a substantial spacing between the lowest numerals thereon, such as "5" and "6," sufficient to provide twenty indicator lines 26 therebetween. At the opposite end of the scale may appear the numerals "98" and "100" spaced a comparatively short distance, permitting the provision of only four indicator lines therebetween. A suitable identifying legend may appear alongside scale 22, such as the words "monthly payment." Also there may appear alongside said scale 22, adjacent one end thereof, identifying indicia such as the words "annual interest rate," with an arrow 28 pointing to the slot 12, preferably at the end opposite that at which the indicia 20 appears.

A cylindrical inner member 30 has a snug sliding and rotative fit within the tube 10. The inner member 30 is of a length greater than the length of the slot 12 and preferably slightly shorter than the length of the tubular member 10. At its opposite ends the inner member 30 mounts hand knobs 32 which preferably are of a diameter slightly less than the inner diameter of the tubular member 10 to have a free fit therein.

The cylindrical member 30 has a plurality of longitudinal scales 34 thereon, as illustrated in FIG. 3, which scales are of different lengths, each correlating time with a selected rate of interest, and sometimes referred to as "time scales." As illustrated in FIG. 3, scales 34 each contain numerals 36 indicating years, and transverse lines or indicia 38 correlated to the numerals 36 and indicating subdivisions of years. The time scales 34 may also include smaller numerals 40 arranged between numerals 36 and indicating months. In the form shown, each longitudinal scale 34 extends from a numeral "1" to the numeral "25," with the numeral "1" of each scale substantially side by side at one end of member 30, and with the spacing between year-indicating numerals 36 progressively decreasing lengthwise of the scale from the low end to the high end of the scale, similarly to the decreasing spacing of the indicia of scales 14 and 22. The parts are assembled with the numerals at the lower ends of the scales 34 located adjacent to numerals at the lower ends of scales 14 and 22 when the inner member 30 is substantially longitudinally centered in the outer tubular member 10. Juxtaposed to each time scale 34, as at the high end thereof, is a numeral 42 indicating the rate of interest with which the scale 34 is correlated. It will be observed that the length of the scales 34 vary with those of lowest interest being of greatest length. The time scales 34 are preferably of such circumferential dimension as to permit clear viewing of each scale at the slot 12 when in register therewith.

A circumferential line 44 encircles the cylindrical inner member 10 spaced from one end thereof and is identified as the "par index line." This circumferential line preferably coincides with the transverse line or indicia 38 associated with the "25" year numeral on the scale 34 associated with or indicated by the rate of interest numeral "3½." A second circumferential line 46 is located on the inner member 30 adjacent the opposite end thereof and is referred to herein, for purposes of convenience, as the decimal index line. The decimal index line 46 is preferably located substantially in register with the transverse line or indicia 38 indicating one year and nine months upon the scale 34 showing interest at the rate of 5¼%. The index lines 44 and 46 are preferably spaced at a distance equal to the spacing between "1000" and "10000" on scale 14, i.e. one cycle on the logarithmic scale 14. This spacing also is one logarithmic cycle on scale 22, such as the spacing between "10" and "100" on scale 22.

It will be understood that the spacing and arrangement of indicia lines and numerals on each of the scales 14, 22 and 34 is logarithmic, as commonly used in all slide rules, and the scales are correlated, so that all scales 34 have the same relation with scales 14 and 22 and with lines 44 and 46 as required for their conjoint use in making calculations, such as those hereinafter described. The device is intended for making computations involving the formula $$\frac{i}{1-\frac{1}{(1+i)^n}}$$

wherein "i" designates rate of interest and "n" designates time required to retire debt, which formula is set out at page 927 in the Handbook of Applied Mathematics, by Martin E. Jansson, 2nd edition, published in 1936 by Van Nostrand Co., New York, N.Y.

Figure 4:
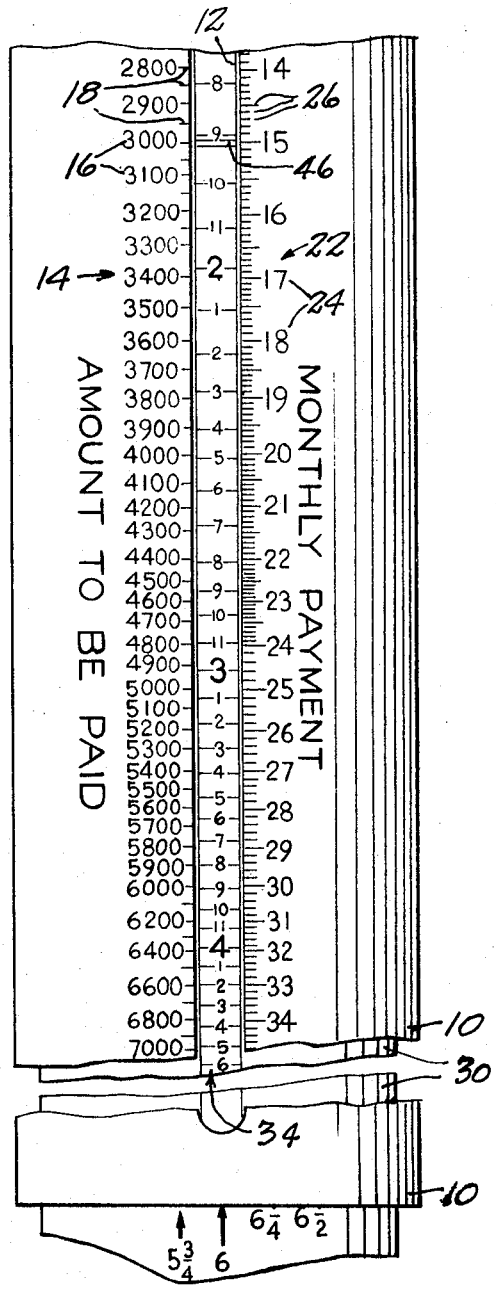
FIG. 4 is an enlarged fragmentary view illustrating the use of the device to perform a calculation.

FIG. 4 illustrates the use of the device for the purpose of ascertaining the length of time required to amortize a loan of $6200 and subject to interest at 6% by payments at the rate of $150 per month. This problem is solved by rotating the inner cylindrical member 30 within the tubular member 10 to cause registration with the slot 12 of the time scale 34 on said inner member which is correlated with the interest rate of 6%. The inner cylindrical member 30 is then slid lengthwise within the tubular member 10 until the decimal index line 46 is aligned with the numeral "15" upon the monthly payment scale 22 which represents the sum $150. The amount of $6200 upon the scale 14 indicating the amount to be paid is then observed and the indicia of the time scale 34 associated with the 6% interest which is aligned with "6200" on scale 14 is then read to ascertain the answer desired, namely, three years, ten and one-half months.

Figure 5:
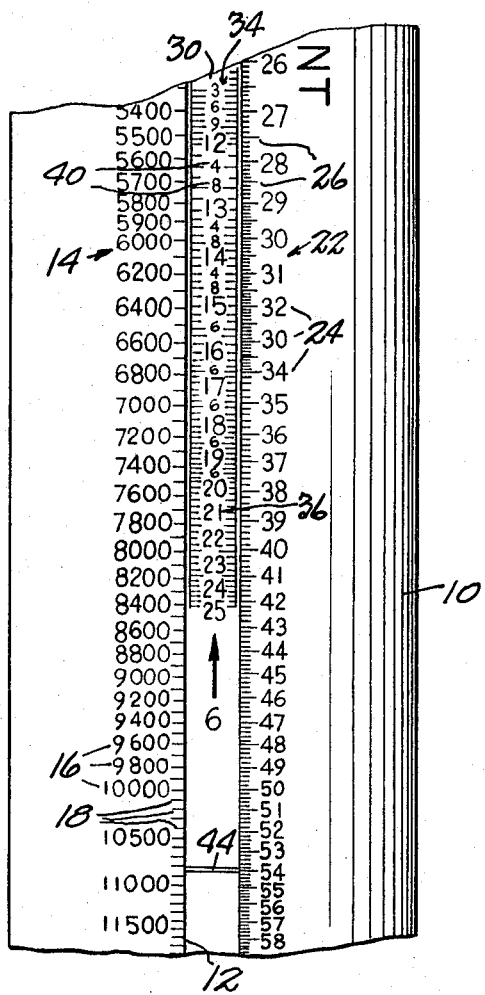
FIG. 5 is another enlarged fragmentary elevational view of the device, illustrating the setting thereof to perform another calculation.

FIG. 5 illustrates the use of the device to ascertain the answer to the question—What is the monthly payment required if $6400 is to be amortized in 15 years, including payment of interest at the rate of 6%? This problem entails rotation of the inner member 30 to bring into register with the slot 12 of the tubular member the time scale 34 associated with the 6% interest rate, followed by longitudinal adjustment of the inner member 30 in the tubular member 10 to bring the year numeral "15" of the time scale 34 into register with the numeral "6400" on the amount to be paid scale 14. The answer is read by reference to the par index line 44 and the monthly payment scale 22 which indicates the answer is "54."

Another example of solution of a problem involving the question of time follows. Assume the question is: What is the amount of time required to amortize a loan of $6200 payable $50 per month at interest of 6%? After bringing to register with the slot 12 the time scale 34 on the inner member 30 which is correlated with the interest rate of 6%, the inner member is moved lengthwise to set the par index line 44 at the numeral 50 on the monthly payment scale 22 of the outer member. The numeral "6200" upon the amount to be paid scale 14 is then located and the answer of sixteen years, two months, will be found on scale 34 to be aligned with the numeral "6200" upon the amount to be paid scale 14.

Another question involving time might be: What is the time required to amortize a loan of $850, payable $11 per month, including interest at 6%. Assuming register of the time scale 34 correlated with the 6% interest rate at the slot 12, the inner member 30 is moved longitudinally to set the decimal index line 46 at the numeral "11" upon the monthly payment scale 22. Then the numeral "8500" (which now represents $850) is observed on scale 14, and opposite it upon the time scale 34 appears the answer, namely 8 years, 2 months.

Another question, which seeks to learn a principal sum or "How much?" would be solved as follows: Assume that we seek to learn what monthly payment is required to amortize a loan of $18,000 in 25 years, including payment of interest at the rate of 4%. The time scale 34 correlated with the rate of interest of 4% is brought into register with the slot 12, and the inner member 30 is adjusted longitudinally until the numeral "25" upon the time scale 34 is positioned opposite the numeral "18000" upon the amount to be paid scale 14. The par index line 44 is then observed and the answer is read upon the monthly payment scale 22 at the point registering with the par index line, giving the answer $95.

Another problem which may be solved with the device is to ascertain the balance due upon a loan. For example, assume that it is desired to determine the balance due after the 36th monthly payment on a loan for $9430, payable at the rate of $154 per month, including interest at 7%. The inner member 30 is rotated to bring the time scale 34 correlated with the interest rate of 7% in register with the slot 12, and the inner member is then longitudinally adjusted to bring the decimal index line 46 opposite "15.4" (now representing $154) upon the monthly payments scale 22. The amount "9430" on the amount to be paid scale 14 is then located, and the answer found upon the time scale 34 in register therewith, namely six years and four months, is now observed, this being the amount of time required to amortize the full amount of the loan, namely $9,430. From this time of six years and four months is then subtracted the number of payments already made, namely, 36, leaving a time remaining of three years and four months. Then keeping the decimal index line 46 opposite "15.4" upon the monthly payment scale 22, and reading the figure on the amount to be paid scale 14, which is in line with the line on the time scale 34 indicating 3 years and 4 months, the balance due is ascertained upon the amount to be paid scale 14, namely $5,480.

Another question which can be solved is the amount of time required to reduce the principal of a loan a given amount. Thus the question might be: What is the time required to reduce the principal of a loan of $5300 to $3920 if the monthly payment is $65, including interest at 6%? Assuming that the 6% time scale is in register with the slot 12, the inner member 30 is adjusted longitudinally to bring the par index line 44 in register with the numeral "65" on the monthly payment scale 22. At this setting the reading on the time scale 34 opposite the numeral 5300 on the amount to be paid scale 14 will be eight years and nine months (105 months), which is the time required to amortize the loan. Now maintaining the same setting of the inner and outer parts, the user can find the indication for six years upon the time scale 34 and will observe that it is opposite the amount 3920 on the amount to be paid scale 14. The difference between the first reading on the time scale 34, namely eight years and nine months, and the second reading on the time scale 34, namely six years, is the answer sought, namely two years and nine months.

Another usage of the device is to ascertain what amount of the principal of a loan a given monthly payment will amortize in a selected number of years. Thus assume the question is: What principal amount will a monthly payment of $12.50, including interest at 7%, amortize in 15 years? Assuming a setting of the inner member 30 with the time scale 34 associated with 7% in register with the slot 12, the inner member is moved to register the par index line 44 with "12.5" upon the monthly payment scale 22. The 15-year numeral upon the time scale 34 is then observed to be opposite and in register with the sum $1390 located on the amount to be paid scale 14.

While the preferred embodiment of the invention has been illustrated and described, it will be understood that changes in the construction may be made within the scope of the appended claims without departing from the spirit of the invention.

I claim:

1. A calculating device for solving problems involving the elements of amount to be paid, monthly payment, interest rate and time, comprising an outer open ended tubular member having a longitudinally extending sight opening extending for at least the major part of the length of said member and an inner cylindrical member snugly slidable and rotatable in said tubular member, said outer member having a graduated longitudinal logarithmic scale of indicia thereon at one side of said sight opening designating a range of amounts to be paid, and having a second graduated longitudinal logarithmic scale of indicia thereon at the other side of said sight opening designating a range of monthly payments, said cylindrical member having a plurality of circumferentially spaced longitudinally extending graduated logarithmic scales of indicia thereon designating a selected range of time and each correlated with a selected rate of interest to provide spacing of indicia on each scale different from the spacing of indicia of other time designating scales, each time designating scale being adapted to be positioned in register with said sight opening, all of said scales on both members having the low end thereof at the same end of the device, said inner member having a circumferential par index line adjacent one end thereof intersecting at least one of said time designating scales and having a circumferential decimal index line intersecting said time designating scales adjacent its opposite end, and spaced from said par index line a distance equal to one logarithmic cycle of one of the logarithmic scales of said outer member, one of said index lines and the time designating scale exposed at said sight opening guiding longitudinal positioning of said cylindrical member in said tubular member relative to a selected scale indicia on one of the scales on said tubular member, whereby an answer may be obtained by observing a selected point of the other scale on said tubular member which registers with a selected mark on said cylindrical member of the group consisting of said time designating scale and said index lines.

2. A calculating device as defined in claim 1, wherein the time designating scales correlated with different rates of interest are of different lengths, each shorter than said sight opening whereby each time designating scale has an individual and different but correlated relationship to each of said circumferential index lines.

3. A calculating device for solving problems involving the elements of time, rate of interest, amounts of periodic payments and principal amount, comprising an outer open ended tubular member having a longitudinally extending sight opening extending for at least the major part of the length of said member, and an inner cylindrical member snugly slidable and rotatable in said tubular member, said tubular member having a pair of graduated logarithmic scales alongside said sight opening and designating amounts of periodic payments and principal amounts, respectively, said cylindrical member having a plurality of indicia circumferentially spaced thereon including a plurality of logarithmically graduated time scales of different lengths and having different spacing of indicia designating a selected range of periods of time and respectively correlated with different rates of interest and adapted to be selectively exposed at said sight opening and also including spaced circumferential index lines adjacent opposite ends thereof each intersecting at least some of said time scales and spaced a distance equal to a logarithmic cycle of one of said scales on said tubular member, said cylindrical member being adjusted longitudinally of said tubular member by registry of a selected one of said time scale and index line indicia thereof with a selected point on one scale of said tubular member, whereby a desired answer may be read at the register of another indicia of said cylindrical member with said other scale of said tubular member.

4. A calculating device as defined in claim 3 wherein each circumferential index line encircles said cylindrical member and at least one index line intersects said time scales on said cylindrical member.

References Cited by the Examiner

UNITED STATES PATENTS

| | | | |
|---|---|---|---|
| 1,203,392 | 10/1916 | Olsen | 235—87 |
| 2,378,863 | 6/1945 | Posson | 235—87 |
| 2,656,978 | 10/1953 | Nicolet | 235—70.8 X |
| 2,725,029 | 11/1955 | Ammerman | 235—87 X |
| 2,970,758 | 2/1961 | Abbate | 235—87 |

STEPHEN J. TOMSKY, *Primary Examiner.*

LEO SMILOW, RICHARD B. WILKINSON, *Examiners.*

T. J. ANDERSON, *Assistant Examiner.*